United States Patent [19]

Yamaguchi et al.

[11] Patent Number: 5,053,665

[45] Date of Patent: Oct. 1, 1991

[54] RETAINING STRUCTURE OF BRUSH SPRING OF ELECTRIC MOTOR

[75] Inventors: Mineo Yamaguchi; Tetsuro Sato, both of Kosai, Japan

[73] Assignee: Asmo Co., Ltd., Kosai, Japan

[21] Appl. No.: 564,187

[22] Filed: Aug. 8, 1990

[30] Foreign Application Priority Data

Aug. 10, 1989 [JP] Japan ............................ 1-94442[U]

[51] Int. Cl.[5] ............................................ H02K 13/00

[52] U.S. Cl. ..................................... 310/239; 310/91; 310/242; 310/244; 310/246

[58] Field of Search ............... 310/238, 239, 241, 242, 310/244, 295, 296, 247, 148, 91, 42

[56] References Cited

U.S. PATENT DOCUMENTS

| | | | |
|---|---|---|---|
| 1,763,549 | 6/1930 | Apple | 310/239 |
| 1,808,747 | 6/1931 | Apple | 310/239 |
| 2,755,399 | 7/1959 | Phillips | 310/239 |
| 3,527,971 | 9/1970 | Means | 310/239 |
| 4,110,651 | 8/1978 | Fagan | 310/239 |
| 4,658,321 | 4/1987 | Linder | 310/238 |

FOREIGN PATENT DOCUMENTS

| | | | |
|---|---|---|---|
| 0924317 | 2/1953 | Fed. Rep. of Germany | 310/246 |
| 0225270 | 7/1985 | Fed. Rep. of Germany | 310/295 |
| 0016153 | 1/1985 | Japan | 310/239 |
| 0026450 | 2/1986 | Japan | 310/239 |

*Primary Examiner*—R. Skudy

*Attorney, Agent, or Firm*—Burns, Doane, Swecker & Mathis

[57] ABSTRACT

The present invention offers a retaining structure of a brush spring of an electric motor, whereby a brush spring is allowed to be mounted in a normal direction only, thus avoiding abrasion of a brush or unexpected halt of the electric motor.

1 Claim, 2 Drawing Sheets

Fig. 1
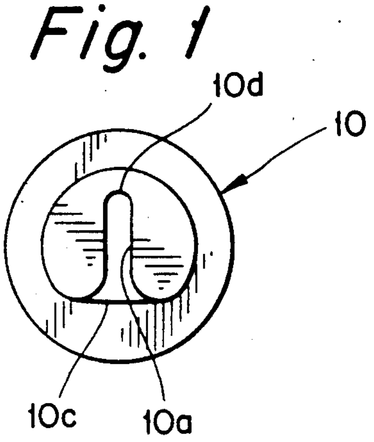
Fig. 2
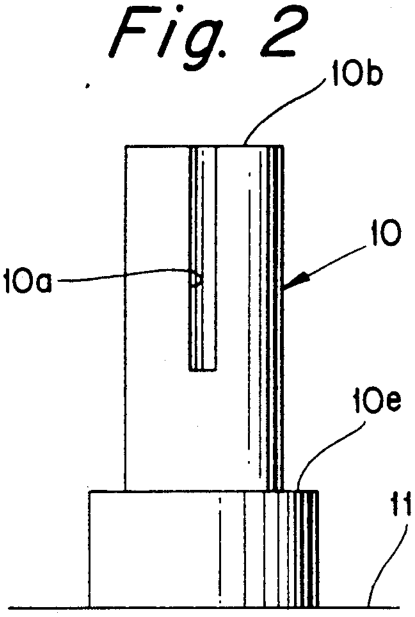
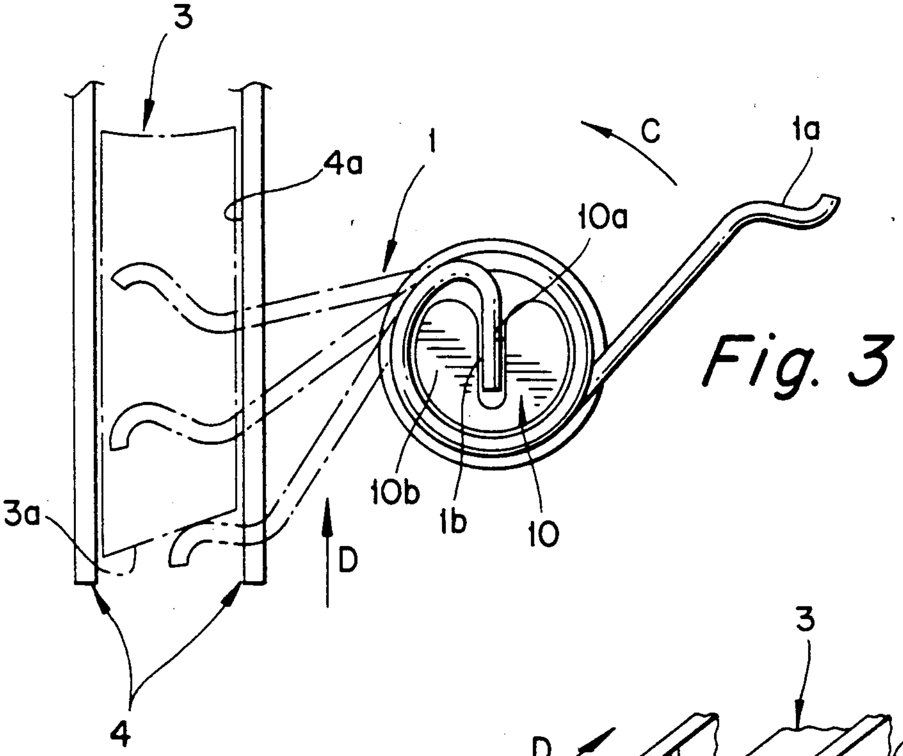
Fig. 3
Fig. 4
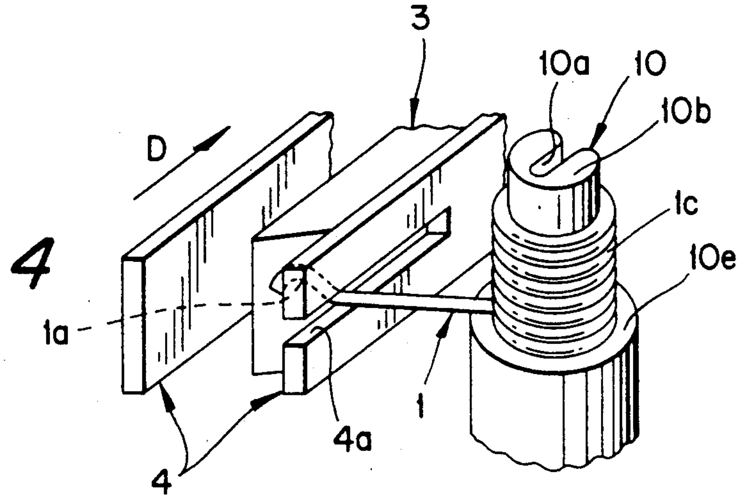

RETAINING STRUCTURE OF BRUSH SPRING OF ELECTRIC MOTOR

BACKGROUND OF THE INVENTION

1. Field of the Invention

The present invention relates to a retaining structure of a brush spring of an electric motor which is designed to mount a brush spring only in a normal direction.

2. Description of the Prior Art

In conventional electric motors, as indicated in FIG. 5, a retainer 2 for holding a brush spring 1 is provided projecting on a support plate (not shown) of the motor at the lateral side of a guide means 4. A brush 3 generally in the form of a block is slidably supported by the guide means 4. The retainer 2 is generally columnar with a front end section thereof forked by an engaging groove 2*a* notched in an axial direction. The brush spring 1 is of the coil type and has its one end projecting outward from a coil portion 1*c* thereby to constitute a brush contact part 1*a* which is brought in contact with the brush 3 to urge the same, and the other end bending inward to the center of the coil portion 1*c* thereby to constitute an engaging part 1*b* which is engaged with the engaging groove 2*a*.

In mounting the brush spring 1 into the retainer 2, the coil portion 1*c* is first fitted in the exterior of the retainer 2, as indicated by a solid line in FIG. 5, such that the brush contact part 1*a* is positioned at the side opposite to the brush 3, and the engaging part 1*b* is engaged with the engaging groove 2*a*. Then, the contact part 1*a* is rotated in a direction shown by an arrow A as indicated by a chain line and inserted into a spring guide groove 4*a* formed in the guide means 4. Accordingly, the contact part 1*a* is brought into contact with an end face 3*a* of the brush 3, whereby the brush 3 is urged in a direction shown by an arrow B by the elastic rebound consequent to the torsion of the brush spring 1.

In the above-described process for mounting the brush spring 1, however, it may happen as is understood from FIG. 6 that the brush spring 1 is inadvertently mounted in the retainer 2 in a direction opposite to the normal direction, i.e., (rotated 180 degrees), and therefore the brush contact part 1*a* is positioned at the side of the brush 3 from the very start. This is because the engaging groove 2*a* of the retainer 2 is formed passing in a diametrical direction. In such state as above, since the brush spring 1 is hardly applied with a torsion, the urging force the brush 3 receives from the brush spring 1 is considerably smaller as compared when the brush spring 1 is mounted in the normal direction. Consequently, although the electric motor encounters no particular inconvenience at the start of use, it is brought to a halt in a short time when the brush 3 is worn out in a worsened sliding condition as a result of vibrations or the like. Even a slight rebound of the brush 3 will reduce the urging force of the brush spring 1, thereby stopping the electric motor.

SUMMARY OF THE INVENTION

An essential object of the present invention is to offer a retaining structure of a brush spring of an electric motor, with eliminating the above-described disadvantages inherent in the prior arts, whereby a brush spring is mounted only in a normal direction to a retainer.

In a retaining structure of a brush spring of an electric mot⁻ ͻccording to the present invention, a retainer for holding a coiled brush spring which has its one end projecting outward from a coil part thereof thereby to form a brush contact part, and the other end thereof bending inward to the center thereof to form an engaging part is provided projecting on a support plate of an electric motor. The retainer is formed generally columnar in the exterior of which is fitted the coil part of the brush spring, and is provided with an engaging groove notched in an axial direction from an end face thereof. One end of the engaging groove is opened in the outer peripheral surface of the groove to extend in a diametrical direction, but the other end of the groove is not opened, but closed. Therefore, the engaging part of the brush spring is engaged into the engaging groove only in a normal direction.

In the structure as above, only one end of the engaging groove of the retainer is opened, so that the engaging part of the brush spring is mounted in the retainer only in the normal direction, and cannot be mounted in a wrong direction.

BRIEF DESCRIPTION OF THE DRAWINGS

This and other objects and features of the present invention will become apparent from the following description taken in conjunction with one preferred embodiment thereof with reference to the accompanying drawings, in which:

FIG. 1 is a plan view of a retainer of a brush spring of an electric motor according to the present invention;

FIG. 2 is a front elevational view of FIG. 1;

FIG. 3 is a plan view showing the state when a brush spring is mounted in the retainer of FIG. 1;

FIG. 4 is a perspective view showing the state when the brush spring urges a brush.

DESCRIPTION OF ONE PREFERRED EMBODIMENT

Figure 5:
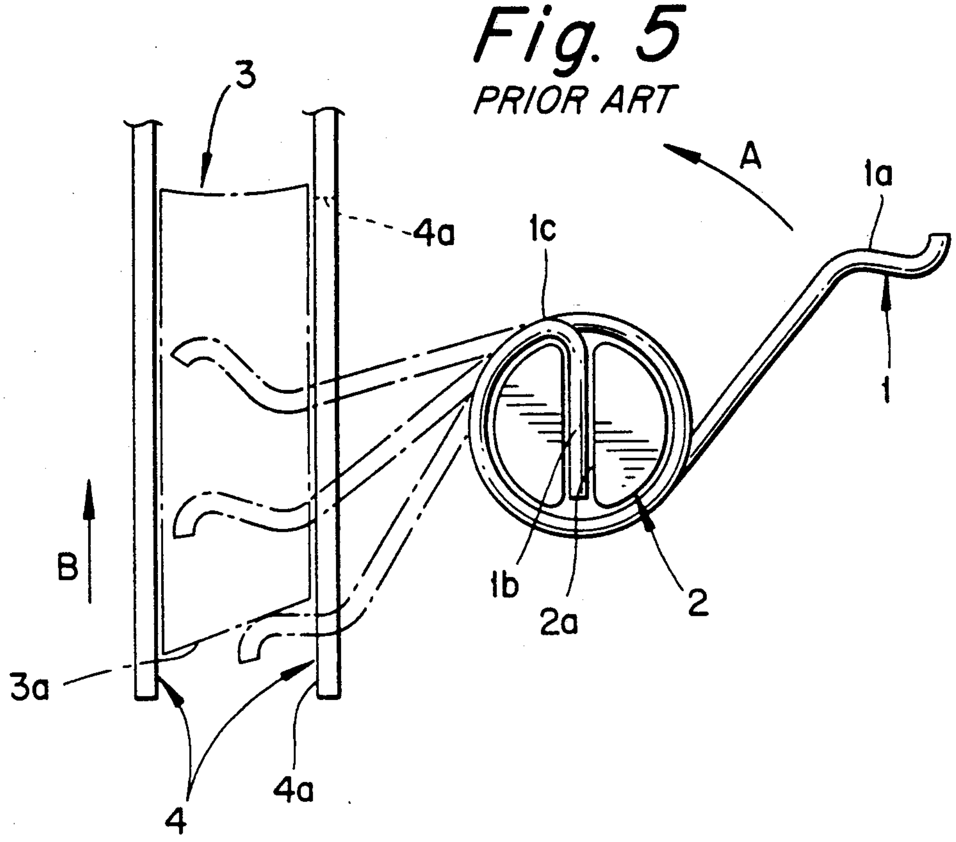
Fig. 5 PRIOR ART
FIGS. 5 and 6 are plan views of a retainer of a brush spring of an electric motor according to prior arts.

Before the description of the present invention proceeds, it is to be noted here that the same parts as in the prior art are designated by like reference numerals throughout the accompanying drawings, and the description thereof will be abbreviated.

Referring to FIGS. 1 and 2, a retainer 10 is integrally formed projecting on a support plate 11 of an electric motor, and is generally columnar, permitting a coil portion 1*c* a brush spring 1 to be fitted on the exterior thereof. The retainer 10 has an engaging groove 10*a* notched a predetermined length from an end face 10*b* thereof in an axial direction. As shown in FIG. 1, the engaging groove 10*a* has one end defining an opening part 10*c* opened in the outer peripheral surface thereof and the other end defining a closed end 10*d* not opened, but. The engaging groove 10*a* extends from the opening part 10*c* to the closed end 10*d* in a diametrical direction of the retainer 10. Moreover, the retainer 10 is provided with a spring stop 10*e* of a large diameter on the lower part thereof so as to engage the coil portion 1*c* of the brush spring 1. The engaging groove 10*a* opens in a direction so as to install the brush contact part 1*a* only in a manner projecting at the opposite side of the brush 3.

Figure 6:
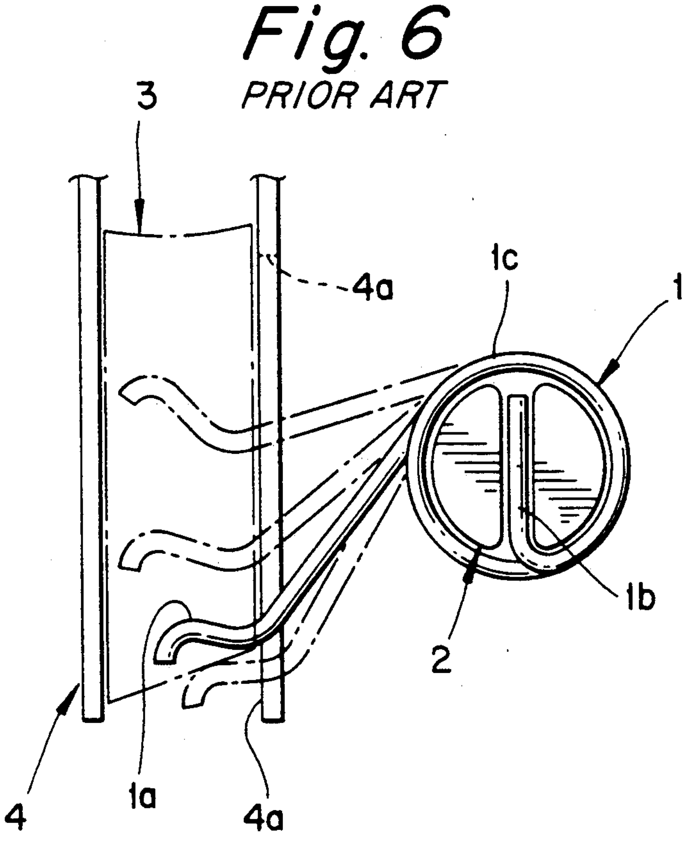
Fig. 6 PRIOR ART

In assembling, as indicated by a solid line in FIG. 3, the coil portion 1*c* of the brush spring 1 at the side of the brush contact part 1*a* is inserted around the exterior of the retainer 10, and the engaging part 1*b* is inserted into the engaging groove 10*a* from the end face 10*b* of the retainer 10. The coil portion 1*c* is held by the spring stop 10*e*. At this time, the opening part 10*c* of the engaging groove 10*a* is directed such that the brush contact part 1*a* of the brush spring 1 is mounted in a normal direction at the side opposite to the brush 3. Therefore, even when it is intended to mount the brush spring 1 in a direction opposite to the normal direction as is the case of FIG. 6, the closed end 10*d* of the engaging groove 10*a* can prevent the engaging part 1*b* of the brush spring from being inserted in the reverse direction. Accordingly, the brush spring 1 is mounted only in the normal direction.

After the brush spring 1 is mounted in the retainer 10, the contact part 1*a* is rotated in a direction shown by an arrow C with a two-dot chain line in FIG. 3. Thereafter, as indicated in FIG. 4, the contact part 1*a* is inserted into a guide groove 4*a* of a guide means 4 into contact with an end face 3*a* of the brush 3.

Accordingly, when the brush spring 1 is mounted in the normal direction to the retainer 10, and consequently applied with a torsion, the elastic rebound of the brush spring 1 can be arranged to be a set value, whereby the brush 3 can be urged by the set rebound in a direction shown by an arrow D in FIG. 4.

As is clear from the foregoing description, in the retaining structure of the brush spring of an electric motor according to the present invention, the brush spring is not allowed to be mounted in a wrong direction. Therefore, the retaining structure of the present invention can prevent an inferior rectification or an undesirable halt of the electric motor.

What is claimed is:

1. A retaining structure of a brush spring of an electric motor, comprising a retainer for holding said brush spring provided as a projection on a support plate of said electric motor, and said brush spring having a first end thereof projecting outward from a coil portion thereof to be a brush contact part and a second end thereof bending inward to the center thereof to be an engaging part, said retainer being formed generally columnar such that said coil portion of the brush spring is inserted in an exterior part of said retainer and is provided with an engaging groove notched from an end face thereof in an axial direction, said engaging groove being open along an outer peripheral surface of said retainer to extend in a diametrical direction of said retainer and closed at an end opposite said engaging groove so that said engaging part of the brush spring is inserted into said engaging groove only in a normal direction.

* * * * *